Oct. 12, 1926.

J. MILLER

REFRIGERATOR TANK

Filed August 28, 1922    2 Sheets-Sheet 1

1,602,923

Inventor
JOSEPH MILLER

By *Paul, Paul & Moore*
ATTORNEYS

Oct. 12, 1926.

J. MILLER

REFRIGERATOR TANK

Filed August 28, 1922    2 Sheets-Sheet 2

1,602,923

Inventor
JOSEPH MILLER
By Paul, Paul & Moore
ATTORNEYS

Patented Oct. 12, 1926.

1,602,923

UNITED STATES PATENT OFFICE.

JOSEPH MILLER, OF MINNEAPOLIS, MINNESOTA.

REFRIGERATOR TANK.

Application filed August 28, 1922. Serial No. 584,896.

The object of my invention is to provide improved means for circulating and cooling the air in a refrigerating box or tank to the end that the highest degree of efficiency may be obtained with the use of a comparatively small body of ice or other cooling medium.

A further object is to provide a refrigerating tank adapted for insertion or application to refrigerating boxes in which bricks or blocks of ice cream are kept for sale, as in ice cream parlors or street vending wagons, or booths; the object being to keep the ice cream or other food in a refrigerated condition without the use of a bulky, expensive refrigerating apparatus, the invention being compact and convenient in form, and easily adapted for use in the ordinary type of refrigerator without material change therein.

A further object is to provide a refrigerator tank embodying improvements over the tank shown in Patent 1,415,381, issued to me, May 9, 1922.

The invention consists generally in various constructions and combinations all as hereinafter described and pointed out in the claims.

In the accompanying drawings forming part of this specification,

Figure 1:
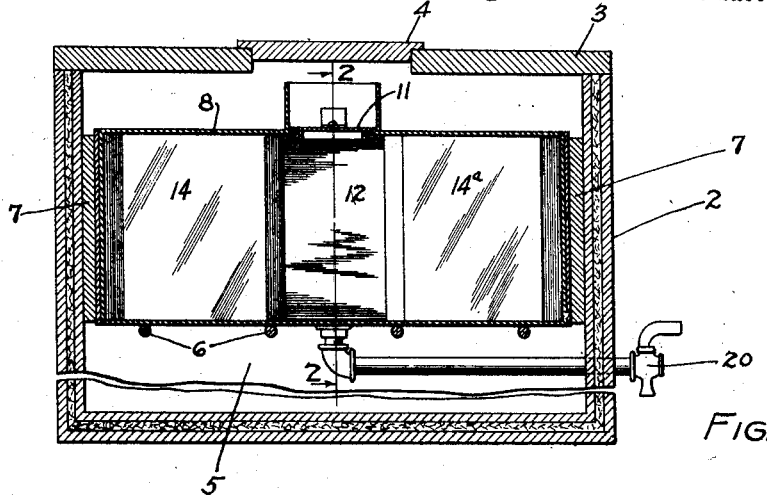
Figure 1 is a vertical sectional view through a refrigerating tank with my invention applied thereto.
Figure 2:
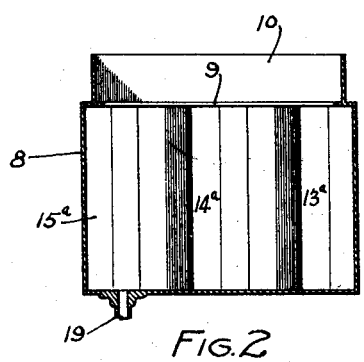
Figure 2 is a transverse sectional view of the tank.
Figure 3:
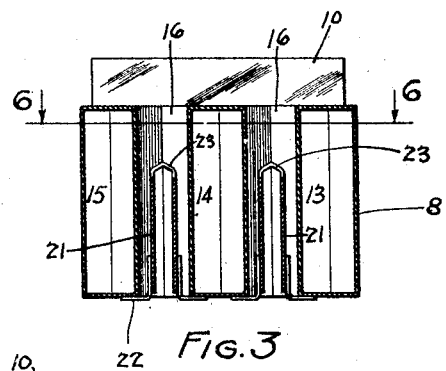
Figure 3 is a sectional view on the line 3—3 of Figure 4.
Figure 4:
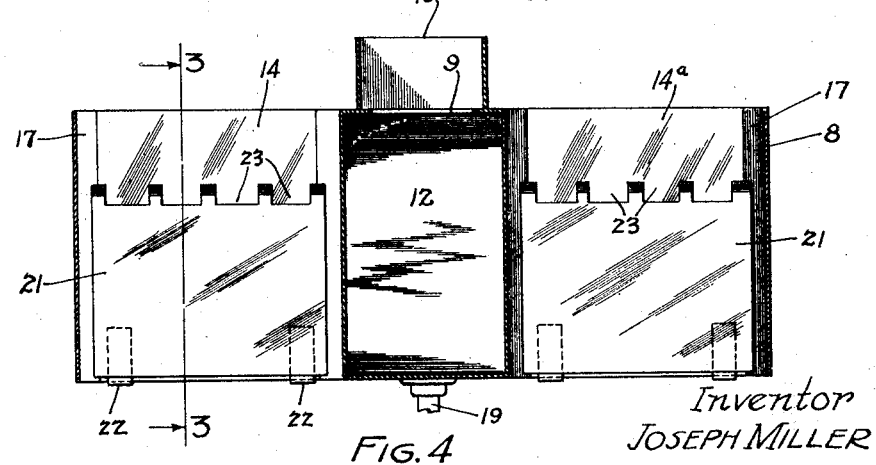
Figure 4 is a longitudinal sectional view on the line 4—4 of Figure 6.
Figure 5:
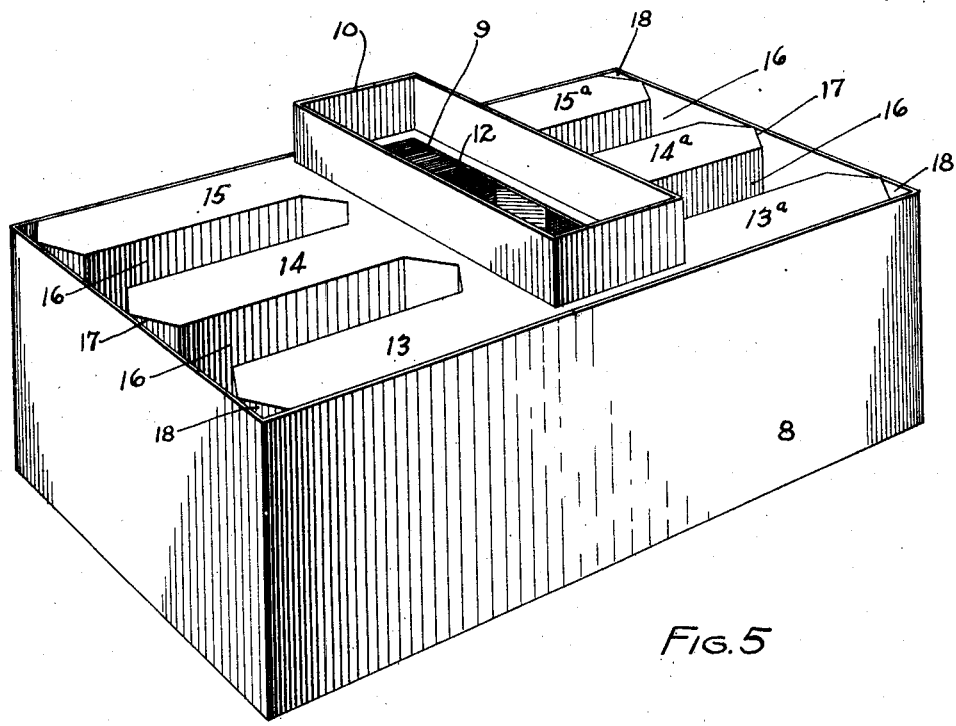
Figure 5 is a perspective view of the tank removed from the refrigerating box.
Figure 6:
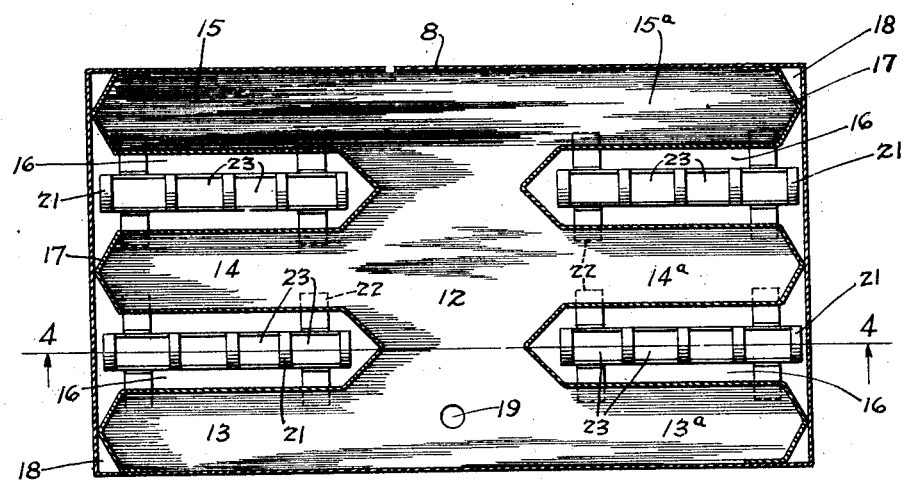
Figure 6 is a horizontal sectional view on the line 6—6 of Figure 3.

In the drawing, 2 represents an ordinary type of refrigerating box having a top 3, and a cover 4. Within this box a food-chamber 5 is provided as usual in refrigerators. Above this food-chamber, I extend a series of rods 6 across the interior of the box, and upon these rods between suitable filler plates 7, I arrange my refrigerating tank which I will designate generally by reference numeral 8. This tank is preferably rectangular in its exterior form and made of sheet metal, and has an opening 9 in the top, inclosed by a vertical flange 10, and provided with a cover 11 which is directly beneath the cover 4, so that convenient access may be had to the space within the tank. Beneath the cover 11, is a chamber 12, wherein the crushed ice and salt is placed. This chamber extends transversely of the middle portion of the tank from the top to the bottom thereof, and on each side is provided with a plurality of wings or extensions 13, 14, and 15, and as these wings are substantially the same on both sides of the chamber, I will designate them by the same reference numerals with the addition of the exponent "a." These wings are hollow, and are filled with ice and salt from the middle chamber, and between the wings vertical flues 16 are formed, which communicate with the bottom with the food-chamber 5, and at the outer ends of the wings. The walls are preferably V-shaped as indicated at 17 in Figure 6 so that little triangular vertical spaces 18 are formed through which the air may circulate and contact with the walls of the wings, thus increasing quite materially the refrigerating surfaces.

Between the wings, the walls of the flues 16 are V-shaped at their inner ends adjoining the ice chamber 12, thereby increasing the refrigerating surface with which the circulating air contacts. A suitable drain pipe 19 leads from the chamber 12 and is equipped with a valve 20 by means of which the waste water may be drawn off the tank.

The air circulating through the flue 16, and contacting with the cold walls thereof, will be very materially cooled and a comparatively small body of ice placed in the ice chamber and the wings connecting therewith, will have the effect of cooling or refrigerating the entire body of ice cream or other food in the chamber 5.

For the purpose of increasing the refrigerating surface of the tank, I may provide auxiliary flues 21, consisting preferably of sheet metal, bent to a substantially U-shaped form in cross-section and secured at 22 to the lower walls of the wings. The upper walls of these auxiliary flues have openings 23 therein, through which the air may circulate after contacting with the walls of the flue. I may or may not use these auxiliary flues, as conditions may require.

While I have shown a central ice chamber with ice containing wings extending therefrom, it will be understood that I do not confine myself entirely to this structure, as the number of wings may be increased or decreased, and the shape may be modified, and the position of the ice chamber in the tank may be changed and still be within the scope of my invention.

I claim as my invention:

1. A refrigerator tank having side and end walls, an ice chamber confined within said walls and having an elongated ice-receiving opening in the top wall thereof extending substantially from side to side of said tank, an upright flange surrounding said opening, a closure for said opening, and said ice chamber having a plurality of ice-receiving extensions oppositely arranged in pairs lengthwise of the tank and having their ends abutting the end walls thereof, whereby a plurality of vertically disposed air-conducting flues will be provided at each end of the tank, said flues being separated by said extensions.

2. A refrigerator tank having side and end walls, an ice chamber confined within said walls and having an elongated ice-receiving opening in the top wall thereof, an upright flange surrounding said opening, a closure for the opening and said ice chamber having an enlarged intermediate portion transversely arranged in said tank beneath said opening and having a plurality of spaced extensions leading therefrom and abutting the ends of the tank whereby a plurality of vertically disposed air-conducting flues will be provided at each end of the tank, said flues and extensions being alternately arranged whereby said air-conducting flues may be surrounded on three sides by a cooling medium.

3. A refrigerator tank having side and end walls, an ice chamber confined within said walls and having an elongated ice-receiving opening in the top wall thereof, a closure for said opening, and said ice chamber having an enlarged intermediate portion arranged transversely of said tank beneath said opening, a plurality of spaced ice-receiving extensions leading from said enlarged intermediate portion to the ends of said tank and abutting the end walls thereof, a plurality of vertically disposed air-conducting flues between said extensions, and the height of each extension being substantially equal to its length whereby the introduction of ice thereinto will be facilitated.

In witness whereof, I have hereunto set my hand this 17th day of August 1922.

JOSEPH MILLER.